US011534902B2

(12) United States Patent
Schmid et al.

(10) Patent No.: US 11,534,902 B2
(45) Date of Patent: *Dec. 27, 2022

(54) POWER TOOL AND METHOD

(71) Applicant: FESTOOL GMBH, Wendlingen (DE)

(72) Inventors: Markus Schmid, Wendlingen am Neckar (DE); Marc Rusch, Esslingen am Neckar (DE); Uwe Werner, Hutten (CH); Remo Sommer, Zurich (CH); Tom Staubli, Zurich (CH); Jorg Evertz, Birmensdorf (CH); Luca Lortscher, Zurich (CH); Miriam Nietlispach, Aarau (CH)

(73) Assignee: FESTOOL GMBH, Wendlingen (DE)

( * ) Notice: Subject to any disclaimer, the term of this patent is extended or adjusted under 35 U.S.C. 154(b) by 275 days.

This patent is subject to a terminal disclaimer.

(21) Appl. No.: 16/632,988

(22) PCT Filed: Jul. 24, 2017

(86) PCT No.: PCT/EP2017/068649
§ 371 (c)(1),
(2) Date: Jan. 22, 2020

(87) PCT Pub. No.: WO2019/020165
PCT Pub. Date: Jan. 31, 2019

(65) Prior Publication Data
US 2020/0206887 A1   Jul. 2, 2020

(51) Int. Cl.
*B25F 5/00* (2006.01)
*B27G 19/04* (2006.01)
(Continued)

(52) U.S. Cl.
CPC .............. *B25F 5/001* (2013.01); *B27G 19/04* (2013.01); *B23D 59/001* (2013.01);
(Continued)

(58) Field of Classification Search
CPC ....... B25F 5/001; B27G 19/04; B23D 59/001; B27B 5/38; F16P 3/148
(Continued)

(56) References Cited

U.S. PATENT DOCUMENTS 3,797,781 A * 3/1974 Hollis ...................... B64G 1/58
244/171.8
4,358,974 A * 11/1982 Sakurai ................ B23D 55/088
700/175
(Continued)

FOREIGN PATENT DOCUMENTS

DE   102015211584 A1   12/2016
JP   2003-527255        9/2003
(Continued)

OTHER PUBLICATIONS

Chinese Office Action in corresponding Chinese Application No. 2017800933693, dated Feb. 7, 2021.
(Continued)

*Primary Examiner* — Laura M Lee
(74) *Attorney, Agent, or Firm* — Hamre, Schumann, Mueller & Larson, P.C.

(57) ABSTRACT

A handheld power tool with a rotatable tool, in which the handheld power tool is a saw blade or milling cutter. The handheld power tool includes a sensor device for detecting a mechanical vector quantity. The mechanical vector quantity includes a force, an acceleration, a velocity, a deflection, a deformation and/or a mechanical stress and the mechanical vector quantity depends on a force emanating from the handheld tool. The handheld power tool also includes a control device which is communicatively coupled to the sensor device and is adapted to recognize an event and/or a state of the power tool according to a direction and/or
(Continued)

change of direction of the mechanical vector quantity detected by the sensor device.

14 Claims, 6 Drawing Sheets

(51) Int. Cl.
    *B23D 59/00*     (2006.01)
    *B27B 5/38*     (2006.01)
    *F16P 3/14*     (2006.01)

(52) U.S. Cl.
    CPC .......... *B25D 2250/221* (2013.01); *B27B 5/38* (2013.01); *F16P 3/148* (2013.01)

(58) Field of Classification Search
    USPC ............ 83/58, 61, 62.1, 76, 72, 74, 75, 76.6
    See application file for complete search history.

(56) References Cited

U.S. PATENT DOCUMENTS

| | | | |
|---|---|---|---|
| 7,739,934 B2* | 6/2010 | Tetelbaum | F16P 3/148 |
| | | | 83/58 |
| 8,635,935 B2* | 1/2014 | Simpson | B23D 35/005 |
| | | | 83/62.1 |
| 10,245,660 B2* | 4/2019 | Myrfield | B27B 15/04 |
| 2004/0181951 A1 | 9/2004 | Wittke | |
| 2006/0159533 A1 | 7/2006 | Zeiler et al. | |
| 2010/0257743 A1* | 10/2010 | George | B27B 17/083 |
| | | | 30/383 |
| 2011/0186319 A1* | 8/2011 | Pellenc | F16P 3/00 |
| | | | 173/176 |
| 2012/0036725 A1* | 2/2012 | Osborne | B27B 17/083 |
| | | | 83/62.1 |
| 2014/0166323 A1 | 6/2014 | Cooper | |
| 2014/0216220 A1* | 8/2014 | Mehta | F16P 3/14 |
| | | | 83/13 |
| 2015/0159097 A1* | 6/2015 | Yen | C10J 3/485 |
| | | | 48/128 |
| 2016/0375570 A1* | 12/2016 | Boeck | G05B 19/4062 |
| | | | 700/169 |
| 2017/0148351 A1 | 5/2017 | Mourad et al. | |
| 2017/0216986 A1* | 8/2017 | Dey, IV | B23D 51/16 |
| 2018/0085965 A1* | 3/2018 | Boerner | B27B 5/29 |
| 2020/0276680 A1* | 9/2020 | Green | B23Q 11/0092 |
| 2021/0276217 A1* | 9/2021 | Zhao | B25F 5/00 |
| 2021/0370544 A1* | 12/2021 | Yabuguchi | B27G 19/04 |

FOREIGN PATENT DOCUMENTS

| | | |
|---|---|---|
| JP | 2008-524003 | 7/2008 |
| WO | 0126064 A2 | 4/2001 |
| WO | 2009032314 A1 | 3/2009 |
| WO | 2014105935 A1 | 7/2014 |

OTHER PUBLICATIONS

International Search Report in corresponding PCT/EP2017/068649, dated Feb. 15, 2018.
Written Opinion in corresponding PCT/EP2017/068649, dated Feb. 15, 2018.
Office Action issued in parallel Korean Patent Application No. 10-2020-7000008, dated May 31, 2021, 14 pages w/translation.
Office Action issued in parallel Japanese Patent Application No. 2020-503747, dated Jun. 22, 2021, 6 pages w/translation.

* cited by examiner

POWER TOOL AND METHOD

The invention relates to a power tool with a rotatable tool adapted as a saw blade or a milling cutter, a sensor device for detecting a mechanical quantity which depends on a force emanating from the tool, and a control device communicatively coupled to the sensor device, which control device is adapted to recognize an event of the power tool in accordance with the detected mechanical quantity.

BACKGROUND OF THE INVENTION

WO 2014/105935 describes a table saw with a kickback detection system comprising a sensor adapted to detect a deflection of a shaft as a scalar quantity. A controller compares the detected deflection with a scalar threshold value to determine whether a kickback is present.

SUMMARY OF THE INVENTION

It is an object of the invention to modify the aforementioned power tool such that the recognition performed by the control device is improved.

The object is solved by a power tool according to claim 1. According to the invention, the sensor device serves to detect a mechanical vector quantity that depends on a force emanating from the tool. The mechanical vector quantity is exemplarily a force, an acceleration, a velocity, a deflection, a deformation and/or a mechanical stress. The control device is adapted to recognize an event and/or state of the power tool according to a direction and/or a change of direction of the mechanical vector quantity detected by the sensor device.

According to the invention, a vector quantity is thus detected and the event and/or the state of the power tool is recognized on the basis of the direction and/or change of direction of this vector quantity. This approach is based on the realization that the tool urges in specific directions during specific events and/or states of the power tool and that for this reason the direction and/or change of direction of a mechanical vector quantity, which depends on the force emanating from the tool, is a good indicator for the recognition of these events and/or states. By taking into account the direction and/or change of direction of the mechanical vector quantity, it becomes possible to recognize the event and/or state in particular earlier than if the recognition is merely based on a scalar quantity. This is due to the fact that there is usually first a specific direction and/or a specific change of direction present before a specific scalar threshold value is exceeded. With the power tool according to the invention, a particularly early—and thus improved—event and/or state recognition can therefore be achieved.

The detected mechanical vector quantity represents exemplarily a force, an acceleration, velocity, deflection, deformation or a mechanical stress and is preferably two-dimensional. The mechanical vector quantity depends on a force emanating from the tool. In particular, the direction of the detected vector quantity corresponds to the direction of the force emanating from the tool or the direction in which the tool urges, especially relative to another component of the power tool. Expediently, the vector quantity is detected in a force flow emanating from the tool.

The state to be determined by the control device is in particular a so-called "kickback" of the power tool. The term "kickback" typically refers to an event in which, while the power tool is machining a workpiece, a sudden and unexpected force occurs between the power tool and the workpiece, which then accelerates and sets in motion the power tool or the workpiece. With circular table saws, a kickback usually leads to an unexpected acceleration of the workpiece in the direction of the user. With circular hand saws, a kickback can cause unexpected movements of the tool. Kickbacks can lead to injuries to the user and therefore represent an impairment of operational safety.

A kickback can occur in particular when the tool is plunged jerkily and too quickly into the workpiece, when sawing backwards, when the tool is jammed in the workpiece, when specific workpiece properties (e.g. inhomogeneous wood, stresses) are present and/or when the tool is blunt. With the event detection described above based on the direction and/or change of direction of the detected mechanical vector quantity, a kickback event can be detected particularly well. The kickback or kickback event to be recognized is in particular an imminent kickback, i.e. an event in which the causes of the kickback are already present but no or no significant acceleration of the power tool and/or the workpiece has yet taken place. Before the power tool or the workpiece is set in motion or significantly accelerated by the kickback, the kickback already announces itself in that the force vector emanating from the tool changes its direction. The tool thus urges shortly before a kickback or at the beginning of a kickback in a different direction than in normal operation. This urging in a different direction can be captured by detecting the mechanical vector quantity, so as to conclude that a kickback state is present.

Furthermore, the event to be detected can be an plunging of the tool into the workpiece, a forward sawing or a backward sawing.

The state to be detected is, in particular, a state of wear of the power tool, preferably a state of wear of the tool designed in particular as a saw blade.

Advantageous embodiments are defined in the dependent claims.

The invention further relates to a method for recognizing an event and/or a state of an power tool with a rotatable tool adapted as a saw blade or a milling cutter. The method comprises the steps of: detecting a mechanical vector quantity, namely a force, acceleration, velocity, deflection, deformation and/or mechanical stress, which depends on a force emanating from the tool, and recognizing the event and/or state of the power tool according to a direction and/or change of direction of the detected mechanical vector quantity.

Preferably, the method is carried out with a power tool described here.

BRIEF DESCRIPTION OF THE DRAWINGS

Further exemplary details as well as exemplary embodiments are explained below with reference to the drawing.

DETAILED DESCRIPTION OF THE INVENTION

Figure 1:
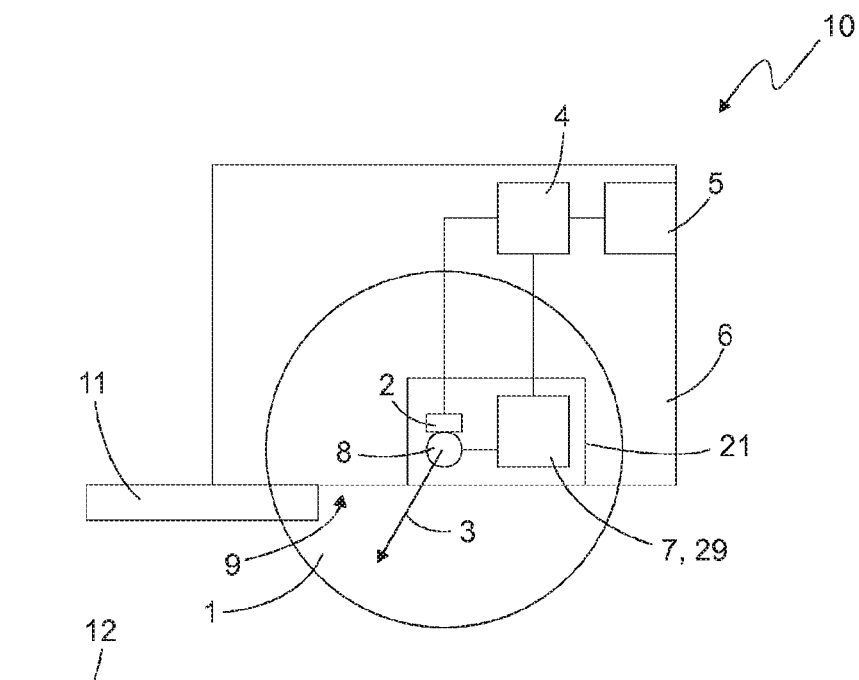
FIG. 1 shows a schematic illustration of a power tool according to a first embodiment.

FIG. 1 shows a power tool 10 according to a first embodiment.

The power tool 10 has a rotatable tool 1, which is designed as a saw blade or milling cutter, a sensor device 2 and a control device 4. The sensor device 2 is adapted to detect a mechanical vector quantity 3. The mechanical vector quantity 3 is a force, an acceleration, a velocity, a deflection, a deformation and/or a mechanical stress. Further, the mechanical vector quantity 3 depends on a force emanated by the tool 1. The control device 4 is communicatively connected to the sensor device 2 and is adapted to recognize an event and/or a state of the power tool 10 according to a direction and/or change of direction of the mechanical vector quantity 3 detected by the sensor device 2.

Since the event and/or state recognition of the power tool 10 is based on a direction and/or change of direction of a detected mechanical vector quantity 3, an event or a change of state of the power tool 10 can be determined at a very early stage. The event and/or state recognition is thus improved.

In the following, exemplary details of the power tool 10 and further exemplary embodiments are explained.

The power tool 10 is preferably a saw, in particular a hand-held circular saw or a plunge cut saw. The power tool 10 can also be designed as a flat dowel milling machine or a jointing machine. The tool 1 is in particular circular and rotates in operation clockwise, for example.

Exemplarily, the power tool 10 has a housing 6, in which in particular the sensor device 2 and the control device 4 are arranged. A contact surface 9 is provided on the housing 6, with which the power tool 10 can be placed on a workpiece 11 to be machined.

The power tool 10 has a drive device 7, which includes, for example, an electric motor and a gearbox. The drive device 7 is preferably controlled by the control device 4. The power tool 10 also has an output shaft 8, which can be driven by the drive device 7. The tool 1 is mechanically coupled to the output shaft 8. Expediently, the tool 1 is attached to the output shaft 8.

The power tool 10 further has a support structure 21, which is expediently located in the housing 6. The output shaft 8, for example, is mounted on the support structure 21. Furthermore, the support structure 21 can be designed as a housing for the drive device 7. The support structure 21 may, for example, represent or comprise a drive housing, in particular a gearbox housing.

Exemplarily, the power tool 10 is further equipped with a user interface 5. The user interface 5 exemplarily comprises an input device that allows the user to switch the power tool 10 on and off and/or to configure and/or to calibrate it, for example.

As shown in FIG. 1, when machining the workpiece 11, the power tool 10 typically lies on the workpiece 11 with the contact surface 9 and is moved in a feed direction 12 relative to workpiece 11. In this constellation, the tool 1 urges relative to the remaining power tool 10 in the direction of the mechanical vector quantity 3, i.e. diagonally downwards. The force emanating from the tool 1 points particularly in the direction of the mechanical vector quantity 3.

In FIG. 1, the sensor device 2 is coupled with the output shaft 8 as an example and is adapted to detect the mechanical vector quantity 3—namely a force, acceleration, velocity, deflection, deformation and/or mechanical stress—of the output shaft 8.

Preferably, the sensor device 2 is adapted to continuously detect the mechanical vector quantity 3, so that a change, in particular a change of direction of the mechanical vector quantity 3, can be detected.

The control device 4 is designed as a microcontroller, for example. The control device 4 is adapted to determine an event and/or a state of the power tool 10 based on the mechanical vector quantity 3. For example, the control device 4 is adapted to determine whether the direction of the detected mechanical vector quantity 3 is within or outside a predetermined directional range and to decide on the basis of this determination whether a specific state is present or not.

Figure 2:
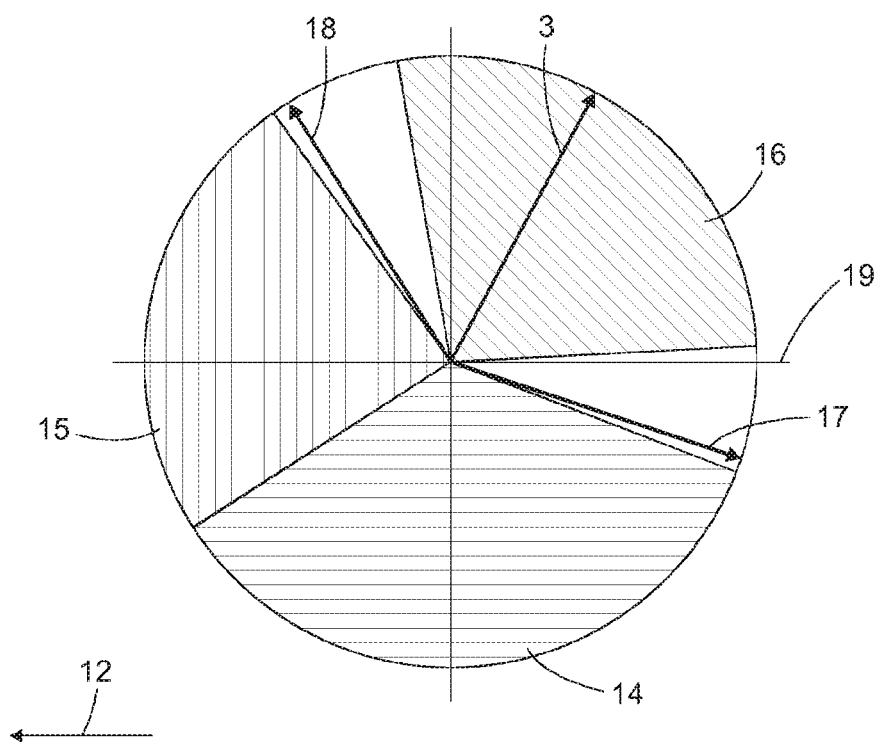
FIG. 2 shows a diagram illustrating an event and/or state recognition based on a direction or change of direction of a mechanical vector quantity.

With reference to FIG. 2 it is explained below in detail how the recognition of a specific event and/or state can be carried out in an exemplary manner.

FIG. 2 shows a diagram with different directional ranges 14, 15 and 16, two directional thresholds 17, 18 and the detected mechanical vector quantity 3.

The diagram is divided into four quadrants. Each quadrant covers 90 degrees. The reference sign 19 indicates the zero degree line. The angle coordinates or degrees mentioned below are to be understood in the mathematically positive direction of rotation (counter-clockwise). Expediently, the zero degree line runs parallel to the contact surface 9 and/or to the feed direction 12.

Directional ranges 14, 15 and 16 are exemplary two-dimensional directional ranges. The directional ranges 14, 15 and 16 can also be called angular ranges.

Expediently, the directional ranges 14, 15, 16 lie in one plane. The plane is expediently aligned parallel to the plane of the tool 1 or perpendicular to the axial direction of the output shaft 8. The directional ranges 14, 15, 16 preferably do not overlap each other.

The control device 4 is adapted to provide at least one directional range 14, 15 or 16. For example, the at least one directional range is stored in a memory in the control device 4. Alternatively or in addition to this, the control device 4 can also be adapted to generate the at least one directional range itself. The control device 4 is further adapted to determine whether the detected mechanical vector quantity 3 is within or outside the directional range 14, 15 or 16 and, based on this determination, to recognize the state of the power tool 10.

Expediently, the control device 4 is adapted to provide a plurality of directional ranges 14, 15, 16 and to recognize different events and/or states based on which of the directional ranges 14, 15, 16 the direction of the mechanical vector quantity 3 is lies in. In particular, a respective event and/or state is assigned to each of the directional ranges 14, 15, 16.

The first directional range 14 represents a directional range in which the mechanical vector quantity 3 lies in when the tool 1 is plunged into the workpiece 11 and the power tool 10 is moved relative to the workpiece 11 in the feed direction 12. As an example, the first directional range 14 is located in the two lower quadrants, i.e. within a range between 180 degrees and 360 degrees. In the example shown, the first directional range 14 extends from 220 degrees to 330 degrees.

A mechanical vector quantity 3, which lies in the first directional range 14, is an indicator that the event or state is present that the power tool 10 is sawing forward in the feed direction 12. Accordingly, the control device 4 is adapted to recognize that a "forward sawing event" or "forward sawing state" is present if the mechanical vector quantity 3 is in the first directional range 14.

The second directional range 15 represents a directional range in which the mechanical vector quantity lies when the tool 1 is plunged in the workpiece 11 and the power tool 10 is moved relative to the workpiece 11 in the opposite direction to the normal feed direction 12—i.e. in the backward direction. Furthermore, the second directional range 15 represents a directional range in which the mechanical vector quantity 3 lies when the tool 1 is being plunged into the workpiece 11. As an example, the second directional range 15 is located in the two left quadrants, i.e. within a range between 90 degrees and 270 degrees. In the example shown, the second directional range 14 extends from 125 degrees to 220 degrees.

A mechanical vector quantity 3, which lies in the second directional range 15, is an indicator of the event or state that the power tool 10 is sawing backwards or that the tool 1 is being plunged into the workpiece 11. Accordingly, the control device 4 is adapted to recognize that a "backward sawing event" or "backward sawing state" or "plunging event" is present if the mechanical vector quantity 3 lies in the second directional range 15.

The first directional range 14 and the second directional range 15 together represent a normal range. As long as the mechanical vector quantity 3 is within the normal range, the control device 4 can assume that a safe operation of the power tool 10 is given and, for example, provide a corresponding signal.

The third directional range 16 represents a directional range in which the mechanical vector quantity lies when a kickback event occurs. As an example, the third directional range 16 is located in the two upper quadrants, i.e. within a range between 0 degrees and 180 degrees. In the example shown, the third directional range 16 extends from 5 degrees to 100 degrees. Expediently, the control device 4 is adapted to recognize the kickback event if the mechanical vector quantity 3 lies in the third directional range 16.

The directional range in which the control device 4 concludes that a kickback event is present can also be defined larger. For example, the boundaries of this directional range can be placed between the boundaries of the normal range and the boundaries of the third directional range 16. This is illustrated in FIG. 2 by the two directional thresholds 17, 18. As an example, the directional thresholds 17, 18 are adjacent to the boundaries of the normal range. Alternatively, the directional thresholds may lie on the boundaries of the normal range.

Expediently, the directional range extending clockwise from the second directional threshold 18 to the first directional threshold 17 may be used instead of the third directional range 16. The third directional range 16 (shown in FIG. 2) is optional in this case.

Expediently, the control device 4 is adapted to recognize the kickback event if the mechanical vector quantity 3 lies between the two directional thresholds 17, 18—i.e. counterclockwise behind the first directional threshold 17 and before the second directional threshold 18. The kickback event can thus be recognized at a point in time when the cause of the kickback is already present, but the power tool 10 or the workpiece 11 have not yet been significantly accelerated or have not yet exerted any recoil or kickback.

Expediently, the control device 4 is adapted to recognize the kickback event 50 ms to 100 ms before an acceleration of the power tool 10 relative to the workpiece 11 would occur (without recognition and reaction to the kickback). For example, the acceleration is an acceleration with a component upwards or a component in a 90 degree direction in the diagram shown.

As an alternative or in addition to the above described event and/or state recognition based on the direction of the detected mechanical vector quantity 3, it is also possible to perform the event and/or state recognition based on a change of direction of the mechanical vector quantity 3.

If, for example, a kickback is imminent, the mechanical vector quantity 3 rotates towards the third directional range 16. The control device 4 may thus be adapted to recognize, based on a detected rotation of the mechanical vector quantity 3, an event and/or a state. For example, the control device 4 is adapted to compare the angular velocity of the mechanical vector quantity to a velocity threshold value and to recognize the event and/or state when the velocity threshold value is exceeded. Furthermore, the control device 4 may be adapted to determine by which angle of change the mechanical vector quantity 3 has changed, in particular within a specific time window, and to compare this angle of change with an angle threshold value in order to detect the event and/or state.

For the kickback detection, the control device 4 may also be adapted to distinguish between different types of kickback. For example, if a kickback is imminent, which occurs during backward sawing or plunging, the mechanical vector quantity 3 rotates counterclockwise (starting from the second directional range 15), while the mechanical vector quantity 3 rotates clockwise for a kickback caused by the tool 1 being jammed in the workpiece 11. The control device 4 may be adapted to take into account the direction of rotation of the mechanical vector quantity 3 when recognizing the event and/or state.

Furthermore, the control device 4 may be adapted to take into account a magnitude of the detected mechanical vector quantity 3 for the state and/or event recognition. For example, the control device 4 may be adapted to recognize the state and/or event only if the magnitude of the mechanical vector quantity 3 is greater than a threshold value. In this way, it is possible to prevent weak impacts occurring during operation from being falsely recognized as kickbacks.

In addition, the control device 4 may be adapted to take into account the time period during which the mechanical vector quantity 3 lies within a specific directional range 14, 15, 16. For example, the control device 4 may be adapted to recognize the state and/or event only if the mechanical vector quantity lies within a specific directional range 14, 15, 16 for longer than a specific time threshold value.

Furthermore, the control device 4 may be adapted to determine whether a wear state exists based on the direction of the detected mechanical vector quantity 3. The wear state can be, in particular, a wear state of the tool 1. The control device 4 may be adapted to provide a directional range and to determine a wear state based on whether the mechanical vector quantity 3 is inside or outside the directional range. As an example, the control device 4 can recognize a reversal of direction, for example a reversal of the direction of force, of the mechanical vector quantity 3 and conclude from this the wear state. The control device 4 can then output an acoustic or visual signal via an signaling device to indicate that the wear state is present.

The specific angle figures of the directional ranges 14, 15, 16 explained above are to be understood purely as examples.

Actual angles may vary depending on the type and construction of the power tool 10. The actual angles of the directional ranges 14, 15, 16 can be determined by calibration. The calibration can be carried out, for example, during the development or manufacture of the power tool and/or by the user.

Expediently, the control device 4 is adapted to calibrate one or more directional ranges 14, 15, 16. For example, the calibration can be initiated via the user interface 5. The control device 4 can then drive the tool 1 via the drive device 7 and, while doing so, detect the mechanical vector quantity 3 via the sensor device 2. Based on the detected mechanical vector quantity 3, the control device 4 may then create a directional range and/or one or more threshold values and store them in a memory of the control device 4. This operation can be performed, for example, when a new tool 1 is mounted. The wear recognition of the tool 1 can thus be improved.

In the following, the sensor device 2 and the detection of the mechanical vector quantity 3 are described in detail.

The sensor device 2 is expediently adapted to detect the mechanical vector quantity 3 as an at least two-dimensional vector. For this purpose, the sensor device 2 is adapted to measure the mechanical quantity underlying the mechanical vector quantity 3 in at least two different spatial directions. The two spatial directions are, for example, a spatial direction parallel to the feed direction 12 and a spatial direction perpendicular to the feed direction 12. Expediently, both spatial directions are perpendicular to the axial direction of the output shaft 8. For example, the sensor device 2 has at least two sensor elements 25, 26. Expediently, each of the sensor elements 25, 26 serves to measure the underlying mechanical quantity—i.e. a force, an acceleration, a velocity, a deflection, a deformation and/or a mechanical stress—in a different spatial direction.

The mechanical vector quantity 3 is in particular a force vector, an acceleration vector, a velocity vector, a deflection vector, a deformation vector and/or a mechanical stress vector or stress tensor. Accordingly, the sensor device 2 can be adapted to measure, in at least two spatial directions, an acceleration, a velocity, a deflection, a deformation and/or a mechanical stress.

The sensor device 2 may in particular comprise a radial measuring bearing 28, with which, for example, the output shaft 8 is mounted. The radial measuring bearing 28 can be adapted to measure, by means of force or stress sensors, for example piezoresistive sensors, the force between the output shaft 8 and the measuring bearing 28 as the mechanical vector quantity 3.

Alternatively or in addition, the sensor device 2 may comprise distance sensors spaced from the output shaft 8 and adapted to detect the deflection of the output shaft 8 as the mechanical vector quantity 8.

Further, the sensor device 2 may include stress sensors, in particular strain gauges (SG), the stress sensors being in particular attached to the support structure 21.

Basically, the sensor device 2 can be configured to measure the mechanical vector quantity 3 at a part within the force flow emanating from the tool 1. The force flow runs exemplarily from the tool 1 via the output shaft 8, a bearing device 27, the support structure 21, the housing 6 and the contact surface 9 to the workpiece 11. In particular, the sensor device 2 is adapted to measure the mechanical vector quantity 3 between two parts being located one behind the other in the force flow.

FIGS. 3 to 6 show a second, third, fourth and fifth exemplary embodiments, in which the detection of the mechanical vector quantity 3 is respectively performed in a different manner. Apart from the design and arrangement of the support structure 21 and the sensor device 2, the second to fifth embodiments correspond to the first embodiments discussed above. The features already explained above in connection with the first embodiment also apply to the second, third, fourth and fifth embodiments.

Figure 3:
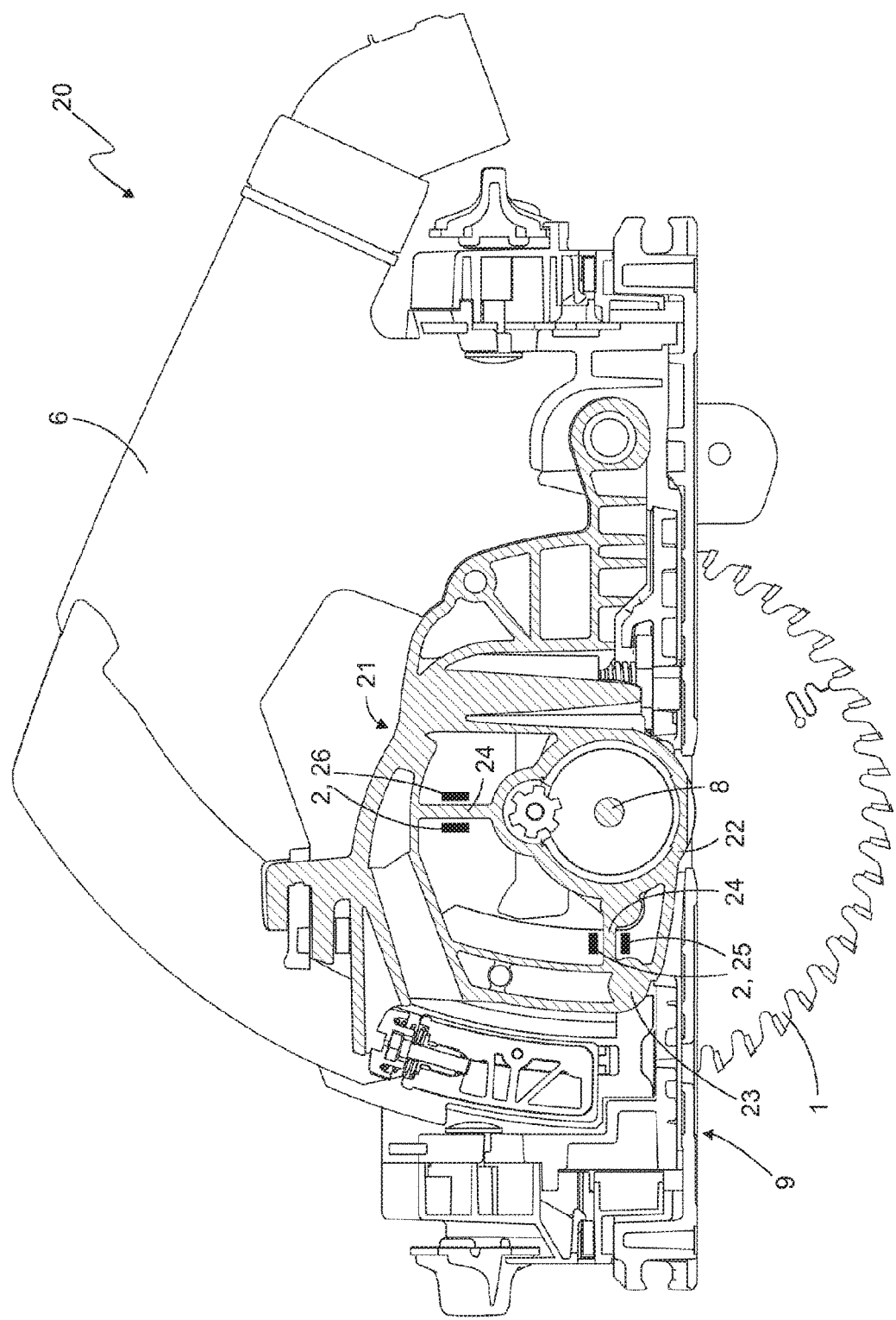
FIG. 3 shows a sectional view of a power tool according to a second embodiment.

FIG. 3 shows a power tool 20 according to the second embodiment. In the second embodiment, the sensor device 2 comprises two sensor elements 25, 26, which are both arranged on the support structure 21. For example, the sensor elements 25, 26 are glued to the support structure 21.

The sensor elements 25, 26 are in particular sensors for detecting a deformation of the support structure 21 caused by a force exerted by the output shaft 8 on the support structure 21. The sensor elements 25, 26 are for example force-stress sensors, especially strain gauges (SG), piezo elements and/or fiber optic sensors.

Expediently, the sensor elements 25, 26 are arranged on two sections 24 of the support structure 21, which sections 24 extend radially outwards relative to the output shaft 8. As an example, the sensor element 25 is arranged on a horizontally running section 24, and the sensor element 26 is arranged on a vertically running section 24. The sections 24 are especially bar-shaped.

The sections 24 expediently connect a first subsection 22 and a second subsection 23 of the support structure 21 with each other. As an example, the first subsection 22 surrounds the output shaft 8. In particular, the first subsection 22 represents or comprises a gearbox housing. Preferably, the output shaft 8 is mounted on the first subsection 22. The second subsection 23 is located in the force flow emanating from the tool 1 behind the first subsection 22, i.e. downstream of the first subsection.

Figure 4:
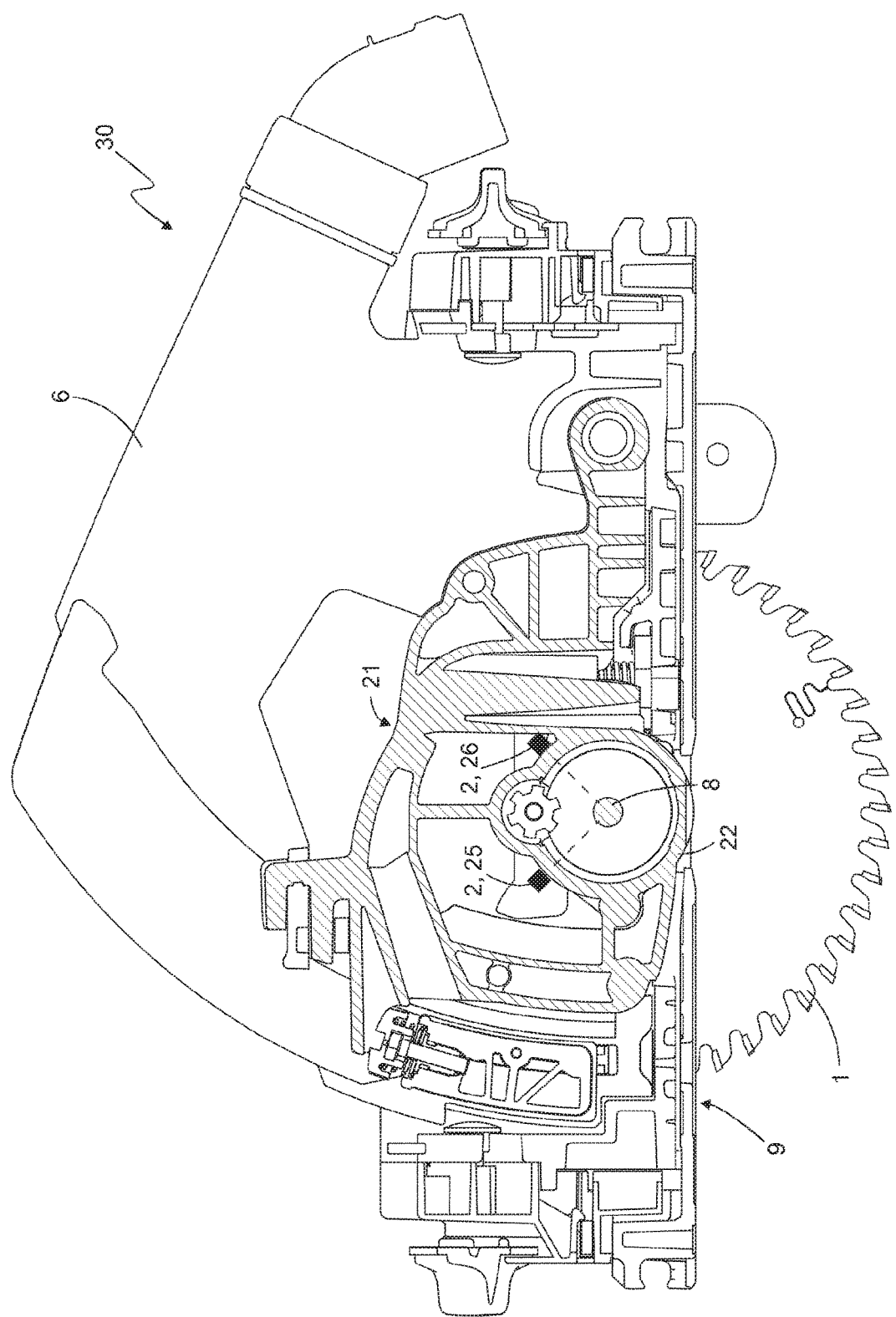
FIG. 4 shows a sectional view of a power tool according to a third embodiment.

FIG. 4 shows a power tool 30 according to the third embodiment. Expediently, the support structure 21 is adapted in the same way as in the second embodiment discussed above.

In the third embodiment, the sensor device 2 comprises two sensor elements 25, 26 which are adapted to detect the deflection of the output shaft 8 in two different spatial directions. Preferably, the sensor element 25 detects the deflection of the output shaft 8 in a first spatial direction and the sensor element 26 detects the deflection in a second spatial direction, in particular rotated by 90 degrees relative to the output shaft 8.

Expediently, the sensor elements 25, 26 are distance sensors, for example eddy current sensors, capacitive sensors and/or inductive sensors. If inductive sensors are used, magnetic particles may be arranged in or on the output shaft 8.

As an example, the two sensor elements 25, 26 are arranged on the support structure 21. Expediently, the sensor elements 25, 26 are arranged in bores, especially screwed in, which bores are preferably provided on the support structure 21. As an example, the two sensor elements 25, 26 are arranged on the inner subsection 22 of the support structure 21.

Figure 5:
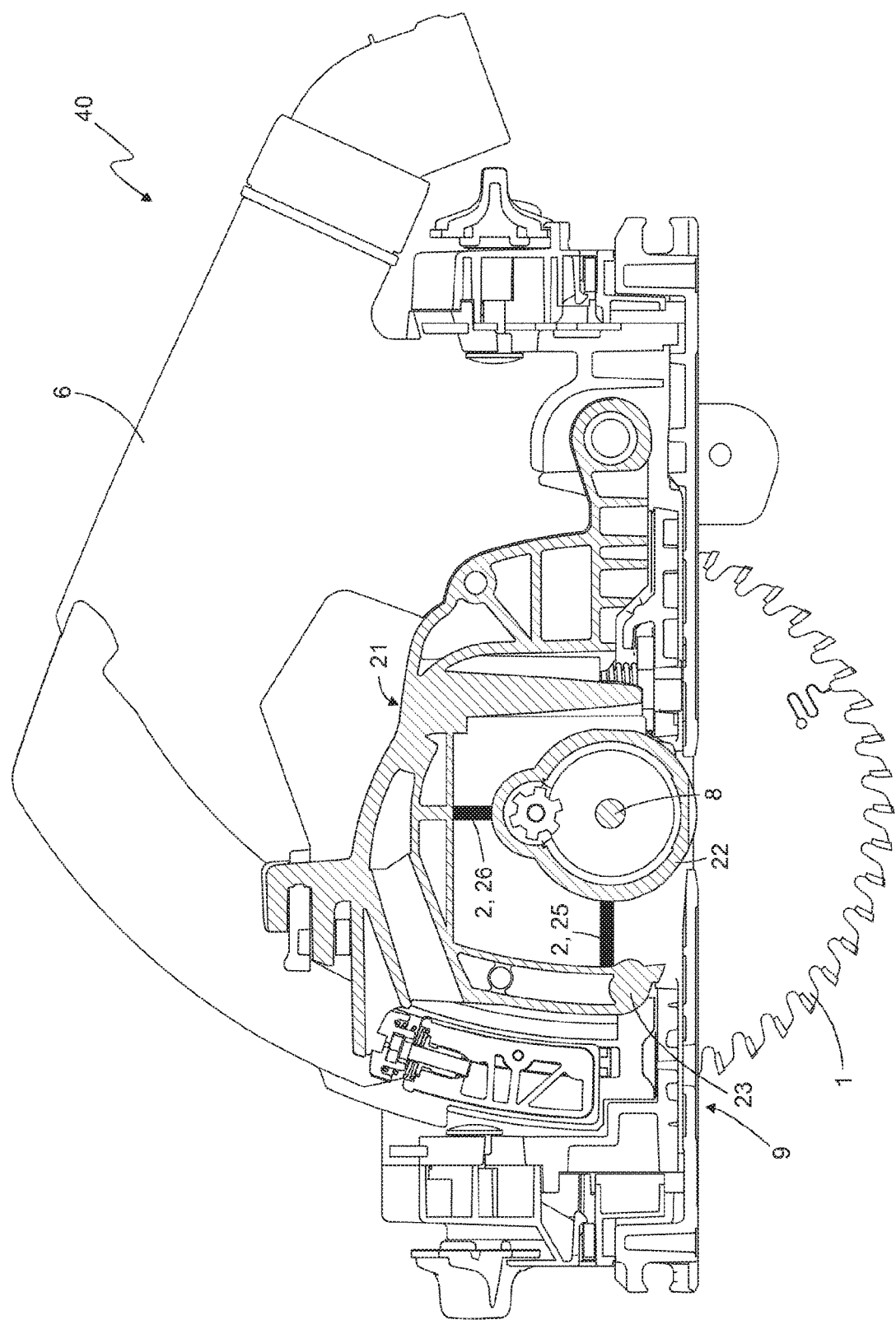
FIG. 5 shows a sectional view of a power tool according to a fourth embodiment.

FIG. 5 shows a power tool 40 according to a fourth embodiment. The fourth embodiment is based on a support structure 21 as described above in connection with the second embodiment, but features in particular the below explained modifications in comparison to the second embodiment.

In the fourth embodiment the sensor elements 25, 26 are arranged between the first subsection 22 and the second subsection 23 of the support structure 21. In particular, the sensor elements 25, 26 are connecting elements that mechanically connect the second subsection 23 with the first subsection 22. As an example, the sensor elements 25, 26 replace the sections 24 discussed above in connection with the second embodiment.

The sensor elements 25, 26 are expediently designed as force sensors and measure the force present between the first subsection 22 and the second subsection 23 in two different spatial directions. Expediently, the two spatial directions are aligned orthogonally to each other. In particular, the first spatial direction is parallel to the contact surface 9 and/or to the feed direction 12 and the second spatial direction is perpendicular thereto.

According to a preferred embodiment, the first subsection 22 represents a gearbox housing and is suspended from the second subsection 23 and/or the remaining support structure 21 via the sensor elements 25, 26, preferably exclusively via the sensor elements 25, 26.

Figure 6:
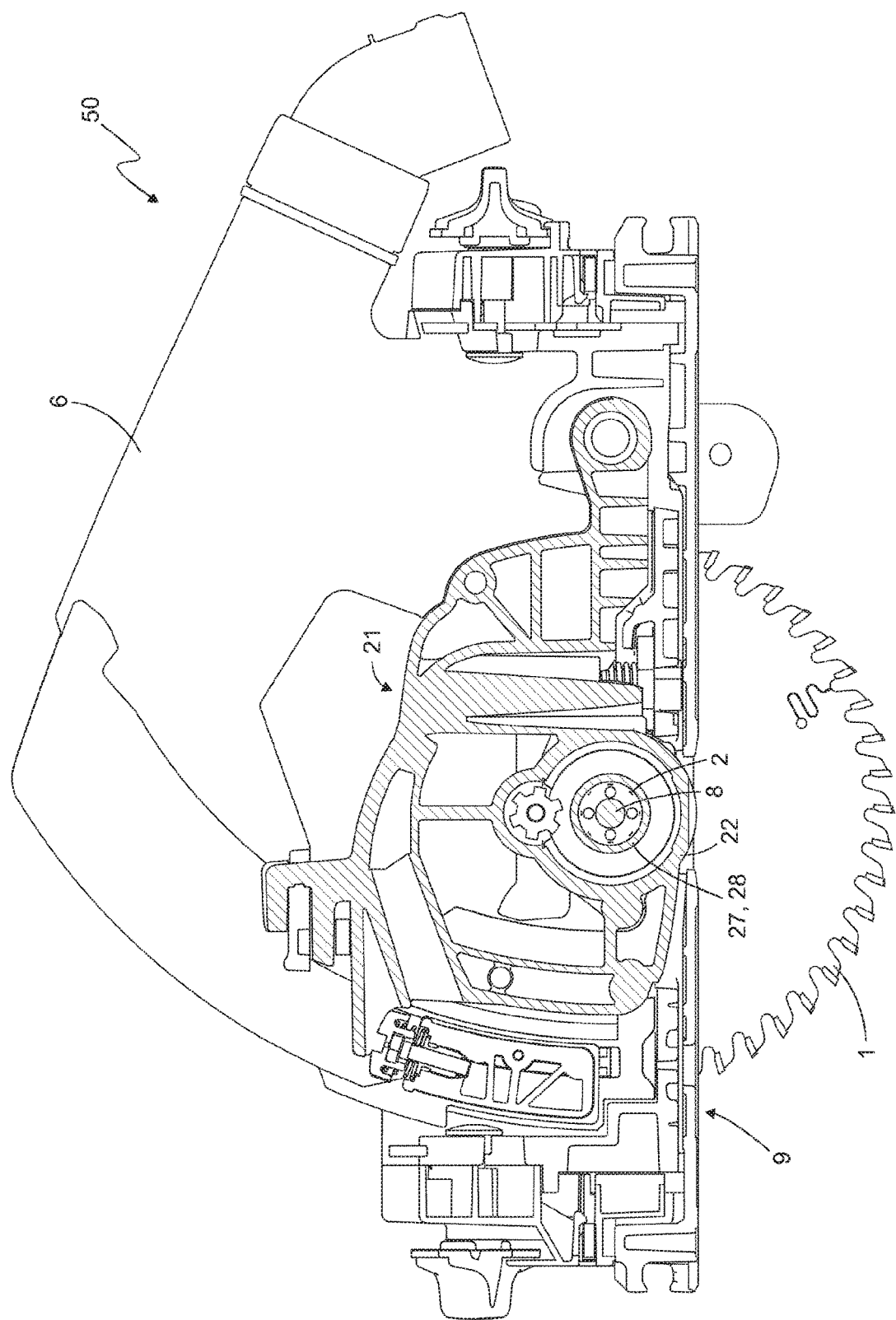
FIG. 6 shows a sectional view of a power tool according to a fifth embodiment.
Figure 7:
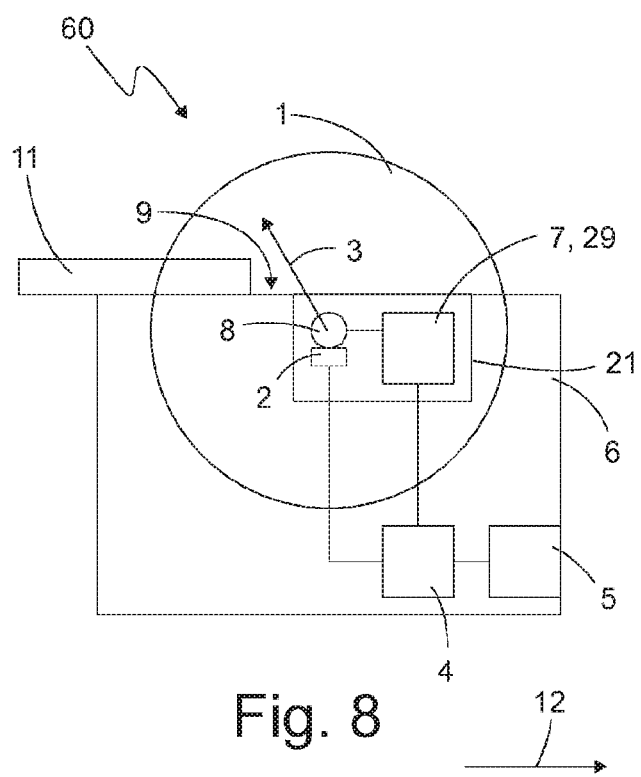
FIG. 7 shows a sectional view of an output shaft and two bearings of the power tool according to the fifth embodiment.

FIG. 6 shows a power tool 50 according to a fifth embodiment. Expediently, the support structure 21 is designed as in the second embodiment described above.

FIG. 6 shows an example of a bearing device 27. Expediently, the bearing device 27 is provided on the support structure 21 and mounts the output shaft 8 relative to the support structure 21. The bearing device 27 expediently comprises one or more bearings 31, 32, in particular radial and/or radiaxial bearings, preferably ball bearings.

Expediently, at least one bearing 31, 32 of the bearing device 27 is designed as a measuring bearing 28, in particular as a radial measuring bearing, and thus represents the sensor device 2. The measuring bearing 28 is preferably adapted to measure a force present between the output shaft 8 and the support structure 21 in at least two different spatial directions. For example, the measuring bearing 28 has a plurality of sensor elements, for example piezoresistive sensor elements, in particular piezoresistive thin-film sensor elements, which are expediently arranged in a circumferential direction around the output shaft 8. In particular, the sensor elements are arranged on an outer bearing component of the measuring bearing 28—i.e. on a bearing component that is stationary relative to the support structure 21 or on a bearing component that does not rotate with the output shaft 8, such as an outer ring. As an example, eight sensor elements are provided, which are offset by 45 degrees to each other.

FIG. 6 shows the output shaft 8 together with two bearings 31, 32 of the bearing device 27. Exemplarily, the first bearing 31 is located in the area of a distal end of the output shaft 8, the distal end being assigned to the tool 1, and the second bearing 32 is located in the area of a distal end of the output shaft 8, which distal end is facing away from the tool 1.

Expediently, one or both bearings 31, 32 is/are designed as the measuring bearing 28 described above.

As an alternative or in addition to the embodiment explained above, where the sensor device 2 is internally integrated in one or more bearings 31, 32, the sensor device 2 may also be located between one or more bearings 31, 32 and the support structure 21.

Figure 8:
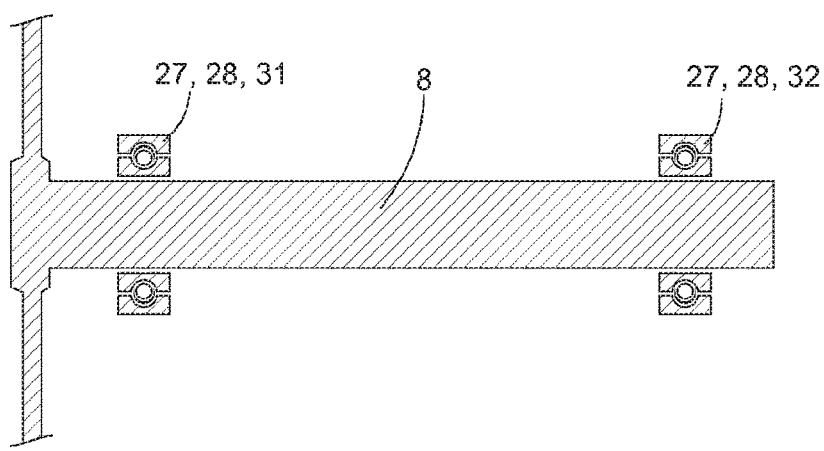
FIG. 8 shows a schematic illustration of a power tool according to a sixth embodiment, and FIG. 9 block diagram of a method.

FIG. 8 shows a power tool 60 according to a sixth embodiment. The power tool 60 is here exemplarily designed as a stationary saw, in particular as a circular table saw. The power tool 60 includes the features already discussed above in connection with the power tool 10. Furthermore, in the case of power tool 60, the sensor device 2 and/or support structure 21 may be designed to correspond to the second to fifth embodiment.

Exemplarily, the tool 1 rotates counterclockwise here. Expediently, the workpiece 11 is pushed into the tool 1, which is designed as a saw blade, so that the saw teeth saw into the workpiece 11 from top to bottom. FIG. 8 shows a corresponding feed direction 12. The directional ranges 14, 15, 16 and/or directional thresholds 17, 18 are adapted accordingly for the power tool 60. For example, the directional ranges 14, 15, 16 and/or directional thresholds 17, 18 shown in FIG. 2 may be point-mirrored around the center of the diagram.

In the following, different possibilities are discussed how to react to a detected event and/or a detected state. Expediently, each of these possibilities can be present at each of the above discussed power tools.

Preferably, the control device 4 is adapted to provide a corresponding signal in response to the detected event and/or state. The control device 4 may, for example, be adapted to store the signal in a memory and/or to output the signal via a signal output unit, in particular an acoustic or visual signal output unit, of the power tool. In particular, the stored signal may be a data recording where data detected by the sensor device 2 is recorded. For example, it is a data recording for the purpose of recording the circumstances of an accident.

Furthermore, the control device 4 can be adapted to perform a specific control of the drive device 7 in response to the recognized event and/or state, for example to cause that the tool 1 is no longer driven and/or is braked, in particular to braked completely. This is especially useful if the recognized event is a kickback event. In particular, braking can be carried out with the same electric motor that is otherwise used to drive the tool 1.

Alternatively or additionally, the power tool may include a braking unit and the control device may be adapted to control the braking unit in response to the recognized event and/or signal so that tool 1 is braked.

The control device 4 is expediently adapted to cause the tool 1 to be braked via the drive device 7 and/or the braking unit for a detected kickback event at a point in time at which no reverse impact or recoil of the power tool and/or workpiece 11 has yet occurred. For example, the braking may occur at a point in time when, returning to FIG. 2, the directional threshold 17 or 18 has already been exceeded, but the mechanical vector quantity 3 is preferably not yet in the third directional range 16. In this way, the reverse impact or recoil caused by the kickback can be reduced or completely prevented.

Furthermore, the power tool 10, 60 may include a positioning device 29 adapted to position the tool 1 selectively in an operating position or in a safety position. The control device 4 may be adapted to control the positioning device 29 in response to the recognized event and/or state so that the tool 1 is positioned in the operating position or the safety position. The positioning device 29 is adapted, for example, to move and/or swivel the tool 1 between the operating position and the safety position. Expediently, the tool 1 is positioned further into housing 6 in the safety position than in the operating position. Expediently, the tool 1 is positioned in the safety position in response to a kickback event.

Figure 9:
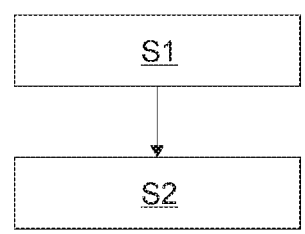

FIG. 9 shows a flow chart of a procedure for detecting an event and/or a state of a power tool 10, 20, 30, 40, 50, 60 with a rotatable tool 1 designed as a saw blade or milling cutter. The method comprises the steps of: detecting, S1, a mechanical vector quantity 3, namely a force, acceleration, velocity, deflection, deformation and/or mechanical stress which depends on a force emanating from the tool 1, and recognizing the event and/or state of the power tool according to a direction and/or change of direction of the detected mechanical vector quantity 3.

Expediently, the procedure is performed using one of the power tools 10; 20; 30; 40; 50; 60 described above.

Preferably, the procedure has a further step in which one of the reactions discussed above is executed on the detected event and/or state.

The invention claimed is:

1. A handheld power tool with a rotatable tool, wherein the rotatable tool is a saw blade or a milling cutter, wherein the handheld power tool comprises:
   a sensor device for detecting a mechanical vector quantity, wherein the sensor device is adapted to detect the mechanical vector quantity as an at least two-dimensional vector by measuring a mechanical quantity underlying the mechanical vector quantity in at least two different spatial directions,
   wherein the mechanical vector quantity comprises a force, an acceleration, a velocity, a deflection, a deformation and/or a mechanical stress, and the mechanical vector quantity depends on a force emanating from the rotatable tool, and
   a control device communicatively coupled to the sensor device, which control device is adapted to recognize an event and/or a state of the handheld power tool according to a direction and/or a change of direction of the mechanical vector quantity detected by the sensor device,
   wherein the sensor device comprises a first sensor element and a second sensor element, the first sensor element being adapted to measure the mechanical quantity underlying the mechanical vector quantity in a first spatial direction and the second sensor element being adapted to measure the mechanical quantity underlying the mechanical vector quantity in a second spatial direction different from the first spatial direction,
   wherein the handheld power tool further comprises a support structure and an output shaft mounted on the support structure, to which output shaft the rotatable tool is coupled, wherein the sensor elements are arranged on the support structure,
   wherein the support structure comprises a first subsection and a second subsection, and the first sensor element is a first connecting element between the first subsection and the second subsection, and the second sensor element is a second connecting element between the first subsection and the second subsection, wherein the first sensor element and the second sensor element are spaced apart from each other.

2. The handheld power tool according to claim 1, wherein the control device is adapted to recognize, as the event and/or the state to be recognized, a kickback, a forward sawing, a backward sawing, and/or a plunging of the tool into a workpiece.

3. The handheld power tool according to claim 2, wherein the control device is adapted to provide at least one angular range and to recognize the event and/or state based on whether the direction of the mechanical vector quantity is within or outside the angular range.

4. The handheld power tool according to claim 2, wherein the control device is adapted to provide a plurality of angular ranges and to recognize different events and/or states based on which of the angular ranges the direction of the mechanical vector quantity lies in.

5. The handheld power tool according to claim 3, wherein the control device is adapted to carry out a calibration of the at least one angular range.

6. The handheld power tool according to claim 2, wherein the control device is adapted to recognize the event and/or state based on an angular velocity of the mechanical vector quantity and/or an angle of change of the mechanical vector quantity.

7. The handheld power tool according to claim 2, wherein the handheld power tool comprises an output shaft, to which output shaft the tool is coupled, wherein the sensor device comprises a radial measuring bearing with which the output shaft is mounted, wherein the radial measuring bearing is adapted to measure a force between the output shaft and the radial measuring bearing as the mechanical vector quantity.

8. The handheld power tool according to claim 2, wherein the control device is adapted to provide a signal in response to the recognized event and/or state.

9. The handheld power tool according to claim 2, wherein the handheld power tool comprises a drive device for driving the tool and the control device is adapted to control the drive device in response to the recognized event and/or the recognized state in order to change the driving of the tool.

10. The handheld power tool according to claim 1, wherein the handheld power tool comprises a positioning device which is adapted to position the tool selectively in an operating position or a safety position and the control device is adapted to control the positioning device in response to the recognized event and/or the recognized state so that the tool is positioned in the operating position or the safety position.

11. The handheld power tool according to claim 1, wherein the control device is adapted to recognize, as the state to be recognized, a state of wear of the tool and/or a state of wear of the handheld power tool.

12. The handheld power tool according to claim 1, wherein the first subsection is a gearbox housing.

13. The handheld power tool according to claim 2, wherein the handheld power tool comprises a drive device for driving the tool and the control device is adapted to control the drive device in response to the recognized event and/or the recognized state in order to brake the tool.

14. A method for recognizing an event and/or state of a handheld power tool with a rotatable tool, wherein the rotatable tool is a saw blade or a milling cutter, wherein the handheld power tool comprises a sensor device which comprises a first sensor element and a second sensor element, wherein the handheld power tool further comprises a support structure and an output shaft mounted on the support structure, to which output shaft the rotatable tool is coupled, wherein the sensor elements are arranged on the support structure, wherein the support structure comprises a first subsection and a second subsection, and the first sensor element is a first connecting element between the first subsection and the second subsection, and the second sensor element is a second connecting element between the first subsection and the second subsection, wherein the first sensor element and the second sensor element are spaced apart from each other, the method comprising the steps:
   detecting a mechanical vector quantity as an at least two-dimensional vector by measuring a mechanical quantity underlying the mechanical vector quantity in a first spatial direction with the first sensor element and measuring the mechanical quantity in a second spatial direction with the second sensor element, wherein the first and second spatial directions are different from each other, wherein the mechanical vector quantity comprises a force, an acceleration, a velocity, a deflection, a deformation and/or a mechanical stress and the mechanical vector quantity depends on a force emanating from the rotatable tool, and recognizing the event and/or state of the handheld power tool according to a direction and/or change of direction of the detected mechanical vector quantity.

\* \* \* \* \*